United States Patent
Nenniger et al.

(10) Patent No.: US 8,857,512 B2
(45) Date of Patent: Oct. 14, 2014

(54) SITU EXTRACTION PROCESS FOR THE RECOVERY OF HYDROCARBONS

(75) Inventors: John Nenniger, Calgary (CA); Stephen Dunn, Thornhill (CA)

(73) Assignee: N-Solv Corporation, Calgary, Alberta (CA)

(*) Notice: Subject to any disclaimer, the term of this patent is extended or adjusted under 35 U.S.C. 154(b) by 738 days.

(21) Appl. No.: 12/601,552

(22) PCT Filed: May 29, 2008

(86) PCT No.: PCT/CA2008/001050
§ 371 (c)(1),
(2), (4) Date: May 28, 2010

(87) PCT Pub. No.: WO2008/144934
PCT Pub. Date: Dec. 4, 2008

(65) Prior Publication Data
US 2010/0236783 A1    Sep. 23, 2010

(30) Foreign Application Priority Data
Jun. 1, 2007  (CA) .................................. 2591354

(51) Int. Cl.
*E21B 43/16* (2006.01)
*C09K 8/592* (2006.01)
*C09K 8/58* (2006.01)

(52) U.S. Cl.
CPC ............... *E21B 43/16* (2013.01); *C09K 8/592* (2013.01); *C09K 8/58* (2013.01)
USPC ........... 166/268; 166/263; 166/264; 166/265; 166/266; 166/267

(58) Field of Classification Search
CPC .......... E21B 43/16; E21B 43/24; H04L 27/08
See application file for complete search history.

(56) References Cited

U.S. PATENT DOCUMENTS

| | | | | |
|---|---|---|---|---|
| 3,838,738 A | * | 10/1974 | Redford et al. | 166/271 |
| 4,008,764 A | * | 2/1977 | Allen | 166/266 |
| 4,299,286 A | * | 11/1981 | Alston | 166/403 |
| 6,883,607 B2 | * | 4/2005 | Nenniger et al. | 166/272.4 |
| 2007/0294036 A1 | * | 12/2007 | Strack et al. | 702/14 |

FOREIGN PATENT DOCUMENTS

CA     281276     2/2001

* cited by examiner

*Primary Examiner* — Zakiya W Bates
*Assistant Examiner* — Silvana Runyan
(74) *Attorney, Agent, or Firm* — Vidas, Arrett & Steinkraus (57) ABSTRACT

An in situ extraction process for the recovery of hydrocarbons from a hydrocarbon bearing formation, including the steps of injecting a solvent consisting substantially of one of the group of H2S, Ammonia or COS into the formation to mobilize the hydrocarbons for extraction by forming a mobile in situ extraction fluid; and lifting the extraction fluid containing the mobilized hydrocarbons from the underground formation to the surface. In a further aspect an extraction method for a specific reservoir is provided including the steps of: establishing a minimum desired extraction rate, based on a value for the porosity, permeability and dead oil viscosity of the in situ bitumen in the specific reservoir, determining a desired minimum operating extraction temperature determining a desirable range of operating pressures identifying solvents predicted to deliver the operating extraction temperature within the range of operating pressures, and selecting a preferred solvent to use in the process.

21 Claims, 3 Drawing Sheets

Figure 1: Correlation

SITU EXTRACTION PROCESS FOR THE RECOVERY OF HYDROCARBONS

FIELD OF THE INVENTION

This invention relates to the recovery of hydrocarbons from underground formations and in particular relates to the in situ recovery of such hydrocarbons. Most particularly this invention relates to the design, construction, and operation of in situ extraction facilities and processes aimed at mobilizing in situ hydrocarbons so that they can be extracted at commercially attractive rates.

BACKGROUND OF THE INVENTION

Hydrocarbons occur in deposits located within the earth. Hydrocarbons may be found at many different depths and pressures and can have a wide range of inherent characteristics. Many hydrocarbon deposits, when first discovered, are fluid enough to be removed from the underground formation, by simple means, such as pumping. However, as the existing reservoirs are pumped down, such easy to recover mobile hydrocarbons become depleted. What is left behind as a relatively immobile in situ fraction may be a significant percentage of the original hydrocarbon deposit.

Other hydrocarbon deposits, such as tar sands deposits, are simply not fluid enough to be pumped in the first place. In this case, other recovery techniques, such as surface mining are preferred. However, many deposits, including a large majority of tar sand deposits in Alberta are buried too deeply to make surface mining viable.

It has long been recognized that methods of enhanced recovery are required to mobilize the otherwise insufficiently mobile in situ hydrocarbons. Various techniques have been developed and used, including methods to try to physically push the less mobile hydrocarbons, such as with water floods, gas injection or the like, or methods to change the viscosity of the hydrocarbons, such as by applying heat, solvents or the like. In the tar sands, in particular, heat has been applied by means of steam, in steam assisted gravity drainage (SAGD), by means of firefloods, such as toe-to-heel air injection (THAI). Solvent stimulations have also been tried, with unheated vapour stimulations, such as (VAPEX), and more recently the present inventor has proposed the use of heated vapourized solvents under condensing conditions (N-SOLV) as set out in prior Canadian patent applications 2,235,085, 2,299,790, 2,351,148, 2,374,115. An apparatus and method of testing in situ extraction processes by the present inventor is described in Canadian 2,436,158. What all of these prior extraction methods have in common is the attempt to cause the in situ hydrocarbons to flow, or to be mobile enough to be economically recovered. Flowing hydrocarbons can be recovered, for example through gravity drainage through the underground reservoir to a production well and then by pumping or some other lifting means to surface facilities.

A difficulty with the design of an extraction or hydrocarbon recovery process and an associated surface facility is understanding precisely what stimulative effect any such process is likely to have on the in situ hydrocarbons. In particular with gravity drainage processes, it is not clear, up to now, what precise effect the solvent has on hydrocarbons or what solvent characteristics are desired or required. Some gravity drainage processes use cold solvent vapour, others use heat and solvent vapour and liquid, others use heat, solvent and water, and others use just heat and water and yet others use combustion or electrical heat to mobilize the hydrocarbon. Some process candidates have a considerable solvent effect, whereas others, such as steam are not soluble per se in the hydrocarbons.

Although various numerical simulations have been developed and are used by researchers to model solvent based gravity drainage processes to try to predict extraction rates, the predictive ability of such numerical models has until now been poor. The numerical models rely on certain assumptions about the extraction mechanism. Field implementations of solvent based gravity processes which are designed using such numerical computer models, have, up until now, not worked as predicted by the models. To add predictability, laboratory testing has also been done of proposed processes, which attempt to simulate field conditions. However, the computer models have so many adjustable parameters that are used to tune the models to measured data, it is not possible to identify reliable experiments from outliers. What is required is a better understanding of the effect of various process parameters on in situ based extraction processes such as solvent processes, so better and more reliable extraction rate predictions can be made.

Many laboratory experiments that have been performed on solvent-based recovery processes have had results which have been published. However, the data from the various experiments is scattered and unconnected. The results of packed bed experiments (either glass bead or sand pack) are inconsistent with the results of Hele-Shaw experiments (oil sandwiched between two glass plates). The results of using one type of solvent at one reservoir condition do not correlate to the use of a different solvent at different reservoir conditions. As a result, the present approach for the industry is very laborious with significant efforts required on a case by case basis to develop an effective process. Furthermore, certain aspects of field (i.e. large) scale underground conditions cannot be accurately reproduced in smaller scale laboratory tests due to boundary conditions, scale-up issues and the like. To date laboratory test results have also not translated well into field results. Since both numerical and experimental results cannot be relied upon, the design and development of new gravity based drainage processes has struggled. The costs of field testing new processes do not warrant the risks inherent with an unpredictable result. Consequently a reliable means for predicting the extraction rates of any given gravity drainage process is very desirable.

As a result, at present there is no accurate way to predict extraction rates for new processes or even reliably estimate what effect changing process parameters, such as solvent choice, extraction pressure and temperature, might have on extraction rates, short of actually trying out the process in the field in a demonstration plant. Field demonstrations of an extraction technology can cost 50-100 million dollars and this entry cost is a barrier to obtaining additional insights into process dynamics. What is desired, is a way of correlating the data of the wide range of experimental production results to understand better the key parameters governing the effectiveness of new extraction processes based on gravity drainage. To date, not only has this not been achieved, it has not been thought possible.

As a consequence of this lack of predictability, industry has resorted to high energy intensity extraction techniques. In the case of steam assisted gravity drainage ("SAGD"), for example, the injected steam can be heated to temperatures in excess of 250 degrees centigrade to deliver as much heat as possible into the formation. Water is preferred as the heat transfer fluid due to its high latent heat capacity. SAGD has proven to be able to extract the in situ hydrocarbons, but requires large amounts of energy, high pressures and good confinement, thick pay zones and the consumption of scarce water resources to conduct the extraction. Consequently the tar sands have been labeled by some environmentalists as one of the dirtiest sources of hydrocarbons in the world. Further, the steam extraction process recovers to the surface all of the unwanted heavy fractions from the in situ hydrocarbons which are subsequently rejected as waste coke, contain toxic metals and sulphur and are placed in vast holding ponds or lagoons on the surface.

What is required is a better understanding of the in situ processes on the in situ hydrocarbons, so a more predictable approach to hydrocarbon extraction can be designed and implemented. Although a heated condensing solvent process offers a lower energy alternative to SAGD for example, and has some promise it is not clear short of a field demonstration plant what extraction results can be expected. Current computer and numerical models predict that it does not provide any advantage relative to unheated solvent vapour extraction whereas lab data shows that it can be commercially attractive. What is needed is a better understanding of all of the prior experimental work, a reconciliation of the apparent discrepancies and thus an improved understanding of what factors are important to an in situ solvent extraction process so that reliable extraction results can be predicted and the factors which affect extraction rates can be better understood.

SUMMARY OF THE INVENTION

The present invention is directed to analyzing and plotting the existing data in a new way which demonstrates an underlying coherence to the data which heretofore has not been appreciated. The present invention is directed to organizing the data in a new way to reveal a correlation between previously unconnected data. From the correlation of data, a better understanding of the underlying mechanisms in operation in gravity drainage processes can be understood and the correlation can be used to help in the design and development of new in situ extraction processes, such as solvent based in situ recovery processes. Such a better understanding can be used according to the present invention to design extraction processes for specific reservoirs and more particularly to optimize a condensing solvent gravity drainage process in specific target reservoirs.

An object of the present invention is therefore to provide a means for reasonably accurately predicting maximum theoretical extraction rates for new extraction processes. According to the present invention many of the technical assumptions complicating the prior numerical models have very little influence, if any, on the rate of in situ extraction and recovery. Furthermore, other key technical factors are believed to be entirely missing from many of the numerical models. The present invention identifies what are believed to be the key process parameters on the basis of certain reservoir characteristics, which both vary from reservoir to reservoir and which are inherent to a specific reservoir. As a result, the present invention allows for the design of an in situ recovery or extraction process which optimizes the key factors which do influence the recovery rates and consequently permits the optimization of recovery rates versus process costs (including capital and operating costs) to be made for various extraction techniques, including solvent based extractions for specific reservoirs.

The present invention is directed to a method of selecting in situ extraction conditions for a particular reservoir given its inherent characteristics, including depth, permeability, porosity and the in situ oil characteristics. The present invention allows for the design of the extraction process to include an understanding of how the selection of solvent affects the process and which solvents might be suitable and which ones might be most suitable. The present invention comprehends predicting how managing the pressure characteristics of the reservoir may be used to optimize economic recovery. The present invention provides a means for determining what solvents to select for specific in situ conditions and how to manage such conditions to achieve optimum results with the specific solvent.

Thus, the present invention additionally provides a basis to select an appropriate solvent for a particular extraction site. A conclusion derived from the correlation of the present invention is that the solvent choice doesn't particularly matter except to provide a heat delivery system to achieve a target extraction temperature and/or extraction rate. Thus, an aspect of the present invention is that under certain conditions, unconventional chemicals such as $H_2S$, $NH_3$ and COS can be used as solvents and provide reasonable extraction results. An advantage of using $H_2S$ and COS as solvents arises because both of these could be produced locally in required quantities from waste byproducts found in volume in the tar sands already. According to a further aspect of the present invention, the use of COS for in situ recovery could provide an efficient means to sequester large amounts of carbon, once the extraction phase was completed. Liquid COS, at reservoir conditions could be argued to achieve much higher carbon storage capacity than $CO_2$ gas for example, in a sand (porous) reservoir.

Therefore, according to one aspect of the present invention there is provided an in situ extraction process for the recovery of hydrocarbons from a hydrocarbon bearing formation, comprising the steps of injecting a solvent consisting substantially of one of the group of H2S, Ammonia or COS into the formation to mobilize the hydrocarbons for extraction by forming a mobile in situ extraction fluid; and lifting the extraction fluid containing the mobilized hydrocarbons from the underground formation to the surface.

According to a further aspect of the present invention there is provided an in situ extraction process for the recovery of hydrocarbons which are substantially immobile at in situ conditions from a hydrocarbon bearing formation comprising:

Determining at least an average porosity and hydrocarbon saturation of the hydrocarbon bearing formation;

Determining a target extraction rate;

Determining a viscosity reduction required to mobilize the hydrocarbons to achieve the desired extraction rate; and Selecting a solvent to achieve the desired viscosity reduction.

BRIEF DESCRIPTION OF THE DRAWINGS

Reference will now be made, by way of example only, to preferred embodiments of the invention by reference to the accompanying figures in which.

DETAILED DESCRIPTION OF THE PREFERRED EMBODIMENTS

The present invention makes use of the extraction rate data from a large number of previously published solvent-based gravity drainage experiments, including specifically the following:

1) Dunn, S; Nenniger, E; and Rajan, R, A Study of Bitumen Recovery by Gravity Drainage Using Low Temperature Soluble Gas Injection, CJChE, Vol 67, December 1989, Pg 978-991
2) Butler, R; and Mokrys, I; A New Process (VAPEX) for Recovering Heavy Oils Using Hot Water and Hydrocarbon Vapour, JCPT, Vol 30, No. 1, January-February 1991, pp 97-106
3) Butler, R; and Mokrys, I; Recovery of Heavy Oils Using Vapourized Hydrocarbon Solvents: Further development of the VAPEX Process, JCPT, Vol 32, No. 6, June 1993, pp 56-62
4) Mokrys and Butler, In situ Upgrading of Heavy Oils and Bitumen by Propane Deasphalting: The VAPEX Process, SPE Paper 25452, 1993
5) Yazdani, A, and Maini, B., Effect of Drainage Height and Grain Size on the Convective Dispersion in the Vapex Process: Experimental Study, SPE paper 89409, 2004
6) "Investigation of "Vapex" Process in a Packed Cell Using Butane as a Solvent", Swapan K. Das and Roger M. Butler, The Canadian SPE/CIM/CANMET International Conference on Recent Advances in Horizontal Well Applications, Calgary, Alberta, March 1994.
7) "Experimental Studies on Effects of Reservoir Heterogeneity on Vapex Process", Jiang, Q., and Butler, R. M., Journal of Canadian Petroleum Technology, Volume 35, No. 10, December 1996.
8) "Recovery of Heavy Oil and Bitumen Using Vapex Process in Homogeneous and Heterogeneous Reservoirs", Qi Jiang, Doctor of Philosophy Thesis, Department of Chemical and Petroleum Engineering, University of Calgary, March 1997
9) "Mechanism of the Vapor Extraction Process for Heavy Oil and Bitumen", Swapan K. Das and Roger M. Butler, Journal of Petroleum Science and Engineering, pp 43-59, Volume 21, 1998.
10) "Investigation of Interfacial Mass Transfer in Vapour Extraction Process", Arash Boustani, Master of Science in Chemical Engineering Thesis, Department of Chemical and Petroleum Engineering, University of Calgary, May 2001.
11) "Evaluation of the N-Solv Process—Experimental Operation and Results, Ted Frauenfeld et al Alberta Research Council, Jul. 25, 2005
12) "In Situ Recovery of Heavy Oil and Bitumen Using Vaporized Hydrocarbon Solvents", Swapan Das, Doctor of Philosophy Thesis, Department of Chemical and Petroleum Engineering, University of Calgary, March 1995.
13) Mehrotra, A. K., and Svrcek, Corresponding States Method for Calculating Bitumen Viscosity", The Journal of Canadian Petroleum Technology, pp 60-66, September-October 1987.

Figure 1:
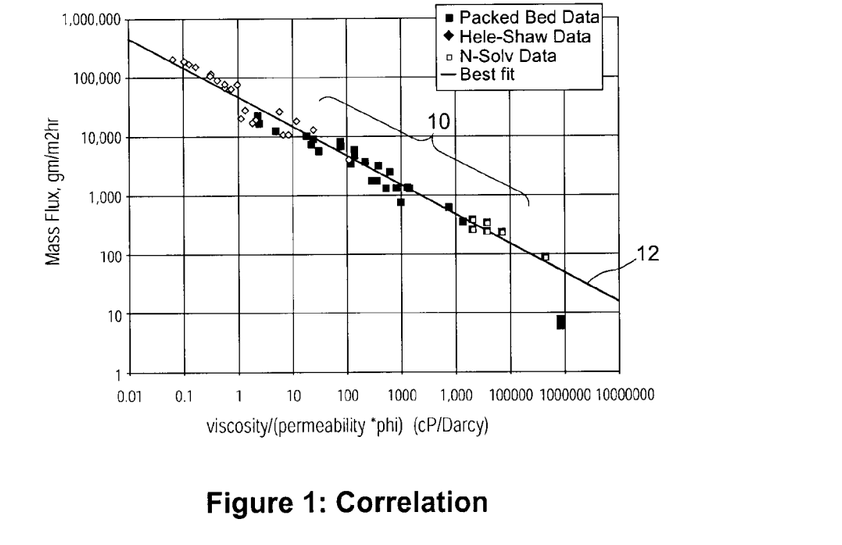
FIG. 1 is a plot of laboratory extraction data for solvent gravity drainage according to the present invention in which the production rate data is correlated against a new parameter which is the dead oil viscosity at the vapour-liquid interfacial temperature divided by the reservoir fractional porosity times the permeability.

Although many of the individual experimental results have been previously published, according to the present invention specific information is extracted from the prior published results and further information is derived from it which results in new data being plotted in a new way in FIG. 1, against some new parameters. An explanation of the specific data treatment used to develop the data correlation for the oil extraction rates follows:

The mass flux is measured in grams of hydrocarbons produced at the bitumen interface per hour on a square meter area of initial vertical interface. The interface area is calculated or derived by knowing the height of the pay zone and the length of the well for each example. Thus the mass flux varies only with the size of the extraction chamber, not with the shape of the extraction chamber. The derived mass flux rate data is then correlated against a new parameter ($\mu/k\phi$) which is the viscosity ($\mu$ in centipoise) of the dead oil at extraction temperature divided by the porosity ($\phi$ in void fraction) and the permeability (k in Darcies) of the sand pack or Hele-Shaw cell. In table 1 below the individual data sets derived from the previously published literature is set out. This data is then plotted in FIG. 1 in a manner explained in more detail below.

FIG. 1, shows the data 10 from packed bed experiments (black squares), Hele-Shaw experiments (diamonds) and N-Solv experiments (grey squares) plotted against each other, or, on the same graph. This correlated data 10 encompasses an extraordinary range of experiments, experimental geometries, temperatures, oil production rates, crude oils and bitumens, oil viscosities, permeabilities, condensing and non-condensing conditions, solvents, and porosities, The correlated data set includes a range of oil production rates that span seven orders of magnitude and the correlating parameter ($\mu/k\phi$) spans a range of more than 4 orders of magnitude. A best-fit line 12 has been drawn through the data 10 as shown. The best fit line is given by:

$$\text{Mass flux} = 42{,}384(\mu/k\phi)^{-0.491}$$

TABLE 1

Summary Table of Solvent based Gravity Drainage Laboratory Tests. Viscosity for ref 2 was obtained from ref 13

| Reference Number | Test Identification | | Solvent | Pressure MPa(g) | Temperature C. | Dead Oil Viscosity at Temp cP | Initial Vertical Interfacial Dimensions | | Permeability Darcy | Number of Production faces | Measured Laboratory Oil Rate Unscaled g/h | Void Fraction Φ | Flow Parameter μ/kΦ cP/D | Measured Mass Flux g/m²h | Predicted Mass Flux g/m²h |
|---|---|---|---|---|---|---|---|---|---|---|---|---|---|---|---|
| | | | | | | | Height cm | Width cm | | | | | | | |
| | Solvent Packed Bed Experiments | | | | | | | | | | | | | | |
| 1 | Dunn, Nenniger, Rajan | Athabasca Run 2 | CO2 | 5.75 | 21 | 227,067 | 30.5 | 5.3 | 2400 | 1 | 28 | 0.35 | 270 | 1732 | 2711 |
| | | Run 3 | CO2 | 5.4 | 19 | 313,966 | 30.5 | 5.3 | 1080 | 1 | 22 | 0.35 | 831 | 1361 | 1562 |
| | | Run 4 | CO2 | 5.55 | 19.5 | 289,246 | 30.5 | 5.3 | 600 | 1 | 21 | 0.35 | 1377 | 1299 | 1219 |
| | | Run 5 | Ethane | 3.55 | 20 | 266,651 | 30.5 | 5.3 | 2400 | 1 | 28 | 0.35 | 317 | 1732 | 2505 |
| 2 | Butler and Mokrys | Tangleflags | Propane | 0.95 | 36 | 2,279 | 7 | 2.54 | 1150 | 2 | 21 | 0.35 | 6 | 11811 | 18092 |
| | | | Propane | 1.15 | 45 | 1,110 | 7 | 2.54 | 1150 | 2 | 30 | 0.35 | 3 | 16873 | 25757 |
| | | | Propane | 1.29 | 47 | 958 | 7 | 2.54 | 1150 | 2 | 31 | 0.35 | 2 | 17435 | 27688 |
| 3 | Mokrys and Butler | Tangleflags | Propane | 0.69 | 24 | 6,948 | 21.7 | 3.5 | 830 | 1 | 56 | 0.35 | 24 | 7373 | 8918 |
| | | | Propane | 0.76 | 24.5 | 6,606 | 21.7 | 3.5 | 830 | 1 | 66 | 0.35 | 23 | 8690 | 9142 |
| | | | Propane | 0.83 | 25 | 6,283 | 21.7 | 3.5 | 830 | 1 | 53 | 0.35 | 22 | 6978 | 9369 |
| 4 | Butler and Mokrys | Tangleflags | Propane | 0.9 | 23 | 7,694 | 21.7 | 3.5 | 1135 | 1 | 72 | 0.35 | 19 | 9480 | 9891 |
| | | | Propane | 1.45 | 45 | 1,110 | 21.7 | 3.5 | 1135 | 1 | 150 | 0.35 | 3 | 19750 | 25591 |
| 6 | Das and Butler | Lloydminster | Butane | <0.14 | 21 | 9,379 | 21.9 | 3.2 | 27 | 2 | 6 | 0.35 | 992 | 856 | 1432 |
| | | | Butane | <0.14 | 22 | 8,533 | 21.9 | 3.2 | 43.5 | 1 & 2 | 16 | 0.35 | 560 | 2283 | 1895 |
| | | | Butane | <0.14 | 22 | 8,533 | 21.9 | 3.2 | 217 | 1 & 2 | 25 | 0.35 | 112 | 3567 | 4172 |
| | | | Butane | <0.14 | 22 | 8,533 | 21.9 | 3.2 | 830 | 1 & 2 | 40 | 0.35 | 29 | 5708 | 8062 |
| 7&8 | Qi Jiang | Tangleflags | Butane | <0.14 | 22 | 8,533 | 21.6 | 3.2 | 43 | 2 | 16 | 0.35 | 567 | 2315 | 1885 |
| | | | Butane | <0.14 | 22 | 8,533 | 21.9 | 3.2 | 220 | 2 | 25 | 0.35 | 111 | 3617 | 4200 |
| 9 | Das and Butler | Peace River | Butane | <0.14 | 21 | 120,128 | 21.9 | 3.2 | 27 | 1 | 3 | 0.35 | 12712 | 428 | 409 |
| | | | Butane | <0.14 | 21.5 | 111,918 | 21.9 | 3.2 | 43.5 | 1 | 4 | 0.35 | 7351 | 571 | 536 |
| | | | Butane | <0.14 | 22.8 | 93,343 | 21.9 | 3.2 | 217 | 1 | 10 | 0.35 | 1229 | 1427 | 1289 |
| | | | Butane | <0.14 | 21 | 120,128 | 21.9 | 3.2 | 830 | 1 | 21 | 0.35 | 414 | 2997 | 2200 |
| 10 | Boustani Yazdani and Maini | Panny Elk Point & | Butane | 0.12 | Ambient | 7,400 | 21.1 | 3.25 | 45 | 2 | 10 | 0.35 | 470 | 1458 | 2067 |
| 5 | | Large | Butane | 0.11 or 0.04 | 22 or 9 | 18,600 | 60.1 | 3.2 | 220 | 1 | 23 | 0.35 | 242 | 1196 | 2865 |
| | | | Butane | 0.11 or 0.04 | 22 or 9 | 18,600 | 60.1 | 3.2 | 330 | 1 | 30 | 0.35 | 161 | 1560 | 3496 |
| | | | Butane | 0.11 or 0.04 | 22 or 9 | 18,600 | 60.1 | 3.2 | 640 | 1 | 44 | 0.35 | 83 | 2288 | 4840 |
| | | Small | Butane | 0.11 or 0.04 | 22 or 9 | 18,600 | 30 | 3 | 220 | 1 | 28 | 0.35 | 242 | 3111 | 2865 |
| | | | Butane | 0.11 or 0.04 | 22 or 9 | 18,600 | 30 | 3 | 330 | 1 | 38 | 0.35 | 161 | 4222 | 3496 |
| | | | Butane | 0.11 or 0.04 | 22 or 9 | 18,600 | 30 | 3 | 640 | 1 | 30 | 0.35 | 83 | 3333 | 4840 |

TABLE 1-continued

Summary Table of Solvent based Gravity Drainage Laboratory Tests. Viscosity for ref 2 was obtained from ref 13

| Reference Number | Test Identification | | Solvent | Pressure MPa(g) | Temperature C. | Dead Oil Viscosity at Temp cP | Initial Vertical Interfacial Dimensions | | Permeability Darcy | Number of Production faces | Measured Laboratory Oil Rate Sided Unscaled g/h | Void Fraction Φ | Flow Parameter μ/kΦ cP/D | Measured Mass Flux g/m2h | Predicted Mass Flux g/m2h |
|---|---|---|---|---|---|---|---|---|---|---|---|---|---|---|---|
| | | | | | | | Height cm | Width cm | | | | | | | |
| 11 | Hatch/NEI at UTF Run 1 | Non-condensing | Propane | 0.48 | 13.5 | ###### | 31.7 | 11.7 | 5 | 1 | 0.2 | 0.35 | 817590 | 5 | 53 |
| | | | Propane | 0.57 | 13.5 | ###### | 31.7 | 11.7 | 5 | 1 | 0.3 | 0.35 | 817590 | 8 | 53 |
| | | | Propane | 0.65 | 13.5 | ###### | 31.7 | 11.7 | 5 | 1 | 0.3 | 0.35 | 817590 | 8 | 53 |
| | | Condensing | Propane | 0.73 | 17 | 755,184 | 31.7 | 11.7 | 5 | 1 | 3.3 | 0.35 | 431534 | 89 | 73 |
| | | | Propane | 1.14 | 33.6 | 57,220 | 31.7 | 11.7 | 5 | 1 | 9.6 | 0.35 | 32697 | 259 | 257 |
| | | | Propane | 1.04 | 30 | 94,607 | 31.7 | 11.7 | 5 | 1 | 9.1 | 0.35 | 54061 | 245 | 201 |
| | | | Propane | 1.14 | 33.6 | 57,220 | 31.7 | 11.7 | 5 | 1 | 12.6 | 0.35 | 32697 | 340 | 257 |
| | Run 2 | Condensing | Propane | 1.27 | 38 | 32,122 | 31.7 | 11.7 | 5 | 1 | 14 | 0.35 | 18355 | 377 | 342 |
| | | | Propane | 1.28 | 38 | 32,122 | 31.7 | 11.7 | 5 | 1 | 10.4 | 0.35 | 18355 | 280 | 342 |
| | Solvent Hele-Shaw Cell Experiments | | | | | | | | | | | | | | |
| 2 | Butler and Mokrys | Tangleflags | Propane | Not given | 20 | 10,546 | 7 | 0.013 | 1356 | 2 | 0.09 | 1.0 | 7.78 | 10124 | 15481 |
| | | Tangleflags | Propane | Not given | 32 | 3,235 | 7 | 0.013 | 1356 | 2 | 0.17 | 1.0 | 2.39 | 19123 | 27656 |
| | | Tangleflags | Propane | Not given | 39 | 1,775 | 7 | 0.013 | 1356 | 2 | 0.24 | 1.0 | 1.31 | 26697 | 37135 |
| | | Tangleflags | Propane | Not given | 46 | 1,031 | 7 | 0.013 | 1356 | 2 | 0.5 | 1.0 | 0.76 | 56243 | 48488 |
| | | Tangleflags | Propane | Not given | 50 | 773 | 7 | 0.013 | 1356 | 2 | 0.53 | 1.0 | 0.57 | 59618 | 55853 |
| | | Tangleflags | Propane | Not given | 50 | 773 | 7 | 0.013 | 1356 | 2 | 0.62 | 1.0 | 0.57 | 69741 | 55853 |
| | | Tangleflags | Propane | Not given | 55 | 551 | 7 | 0.013 | 1356 | 2 | 0.7 | 1.0 | 0.41 | 78740 | 65954 |
| | | Tangleflags | Propane | Not given | 59 | 427 | 7 | 0.013 | 1356 | 2 | 1 | 1.0 | 0.31 | 112486 | 74749 |
| | | Tangleflags | Propane | Not given | 60 | 401 | 7 | 0.013 | 1356 | 2 | 0.93 | 1.0 | 0.30 | 104612 | 77090 |
| | | Tangleflags | Propane | Not given | 70 | 226 | 7 | 0.013 | 1356 | 2 | 1.26 | 1.0 | 0.17 | 141732 | 102159 |
| | | Tangleflags | Propane | Not given | 75 | 174 | 7 | 0.013 | 1356 | 2 | 1.36 | 1.0 | 0.13 | 152981 | 116154 |
| | | Tangleflags | Propane | Not given | 80 | 136 | 7 | 0.013 | 1356 | 2 | 1.49 | 1.0 | 0.10 | 167604 | 131092 |
| | | Tangleflags | Propane | Not given | 90 | 87 | 7 | 0.013 | 1356 | 2 | 1.64 | 1.0 | 0.064 | 184477 | 163245 |
| | | Tangleflags | Propane | Not given | 90 | 87 | 7 | 0.013 | 1356 | 2 | 1.67 | 1.0 | 0.064 | 187852 | 163245 |
| 12 | Das | Athabasca | Propane | 0.88 | 25 | 120,000 | 8 | 0.025 | 5376 | 1 | 0.27 | 1.0 | 22.32 | 13287 | 9225 |
| | | Cold Lake | Propane | 0.88 | 25 | 61,000 | 8 | 0.025 | 5376 | 1 | 0.36 | 1.0 | 11.35 | 17717 | 12861 |
| | | Peace River | Propane | 0.88 | 25 | 30,000 | 8 | 0.025 | 5376 | 1 | 0.53 | 1.0 | 5.58 | 26083 | 18222 |
| 10 | Boustani | Tangleflags | Propane | 0.88 | 25 | 5,000 | 8 | 0.025 | 5376 | 1 | 1.44 | 1.0 | 0.93 | 70866 | 43920 |
| | | Dover | Propane | 0.88 | 20.5 | 543,800 | 7.4 | 0.025 | 5376 | 1 | 0.08 | 1.0 | 101.15 | 4256 | 4393 |
| | | Panny | Propane | 0.88 | 10.5 | 51,676 | 7.4 | 0.025 | 5376 | 1 | 0.19 | 1.0 | 9.61 | 10109 | 13952 |
| | | Panny | Propane | 0.88 | 19.5 | 10,800 | 7.4 | 0.025 | 5376 | 1 | 0.31 | 1.0 | 2.01 | 16493 | 30092 |
| | | Panny | Propane | 0.88 | 23 | 5918 | 7.4 | 0.025 | 5376 | 1 | 0.38 | 1 | 1.10 | 20217 | 40432 |

The term solvent as used in this specification means a substance which is capable of being delivered to the formation at extraction pressure as a vapour, and then condensing onto the bitumen interface to release a latent heat of condensation to the bitumen, and which has a range of solubility parameter of between 25 and 6 $(MPa)^{1/2}$. The correlation of FIG. 1 is believed to be most representative of condensing solvent or vapour extraction processes that utilize gravity drainage as an extraction mechanism for reasons that will be discussed in more detail below.

While there is more scatter in the data as set out in FIG. 1 at high bitumen viscosity and low permeability shown at 14, this is in part due to the difficulty of making accurate measurements when the extraction rates are extremely low. If the data points above 500,000 on the x-axis are ignored, the correlation coefficient is excellent, $R^2=0.97$ (as those skilled in the art will appreciate, $R^2=1$ is a perfect correlation). This strong correlation among the approximately 60 data points from three different types of experiments (liquid to bitumen, vapor to bitumen and condensing vapor to bitumen) provides considerable confidence that the correlation reflects an underlying technical phenomenon (coherence) and that therefore according to the present invention proposed processes can be plotted on the same basis to determine what the expected results will be, with a similar high degree of confidence.

It is understood that while the parameters used in the correlation are convenient to measure and familiar to many oilfield engineers, these particular parameters are thought to be proxies for other parameters more directly related to the physical chemistry of the extraction mechanism. For example, dead oil viscosity at interface temperature is thought to be a proxy for diffusion coefficient of solvent in the bitumen at interface conditions. Similarly, $(k\phi)^{1/2}$ may be a proxy for the pore throat size in the sandpack. In any event, the usefulness of the correlation is not limited by the particular choice of correlating parameters (or other proxy parameters). The usefulness of the correlation derives from the knowledge of the functional relationships. More specifically, the usefulness of the correlation comes from the prediction of the maximum theoretical extraction rate for a solvent based gravity drainage process.

For a specific set of in situ operating conditions, the correlation plot of FIG. 1 provides a basis for predicting the theoretical maximum or ideal extraction rate from the reservoir. The term theoretical maximum or ideal extraction rate is used, because the experiments which produced the data plotted in FIG. 1 were in general conducted at ideal laboratory conditions in the lab, for example, using pure sand or glass beads instead of sand, or even without any sand at all, and modified or otherwise upgraded bitumen. The field production results are likely to be somewhat less than the ideal lab results due to less than ideal field conditions, including challenging geological conditions (clay layers), non-condensable gases naturally arising within the extraction chamber as the bitumen warms, precipitated asphaltenes and variable bitumen characteristics. However, it is believed that the present invention yields results that are highly indicative of the relative extraction rates of the specific extraction processes being considered. The effect on the extraction rate of varying the pressure, temperature and solvent selection can now be estimated.

According to the present invention the maximum oil production rates can be predicted from the mass flux provided by the plot of FIG. 1 for many different processes and at different process conditions and with a reasonable degree of confidence. This plot 10 with the best-fit line 12 shows that the extraction or recovery rate is dependent on a very small number of parameters over an extraordinarily large range of extraction rates. What is unexpected, compared to the prior art complex numerical modeling, is that only one parameter, namely the dead oil viscosity at interface temperature, is required to characterize the fluid properties of the mobilized hydrocarbons. The present invention therefore provides a much simpler and easier method of predicting relative extraction or recovery rates than previous theoretical descriptions of solvent based gravity drainage that required very complex fluid description and numerical calculation. This parameter, dead oil viscosity at the interface temperature, is not believed to have been considered in the prior numerical models used for modeling gravity based solvent extraction processes. It can now be understood by those skilled in the art from the correlation of FIG. 1 that this parameter, namely, dead oil viscosity at interface temperature, is an important aspect of being able to predict relative extraction rates according to the present invention.

The data correlation of the present invention is believed to reconcile a long-standing discrepancy between Hele-Shaw experiments and packed bed experiments. Previously theoreticians had noted that the extraction rates in packed beds were about 10 times higher than in Hele-Shaw experiments. FIG. 1 shows that the discrepancy is resolved because the two experimental procedures provide collinear results with both sets of experiments lying similarly close to the best fit line 12 of the plot 10.

Figure 2:
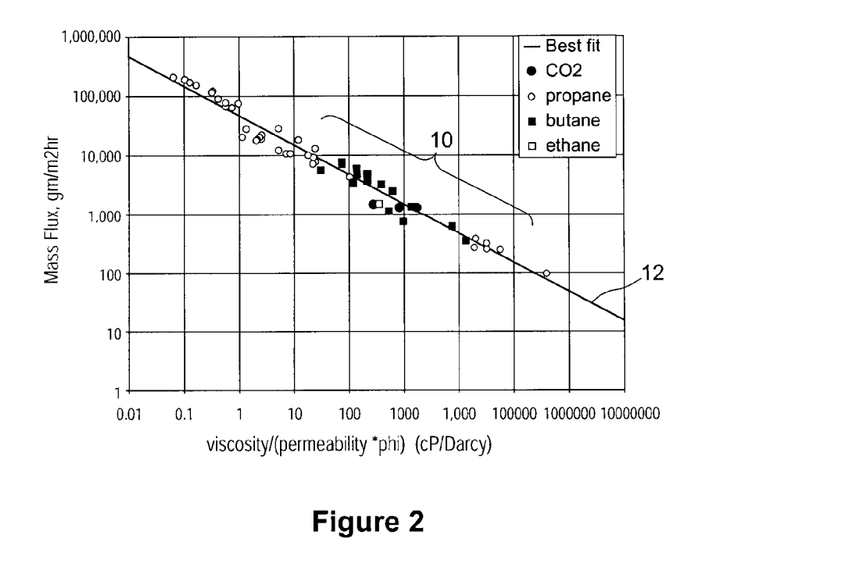
FIG. 2 is a plot of the same data as in FIG. 1, but this time identifying the specific solvents used in different experiments plotted in FIG. 1.

FIG. 2 is a further graph, with the same data as presented in FIG. 1 but now plotted to identify the particular solvents which were used in the various experiments from which the data plotted in FIG. 1 was derived. FIG. 2 shows four very different solvents can be plotted on the same graph (ethane, propane, butane and $CO_2$). Thus, according to the present invention, even these four different solvents fall within the tight confidence range of the plotted correlation. That these different solvents are collinear within a reasonable scatter to the best fit line 12, means that there is no particular advantage to extraction rates based solely on the solvent effect of the solvent. In other words, according to the present invention the extraction rate is overwhelmingly determined by the oil properties and does not depend on the solvency or dissolving power of the solvent. The present invention therefore comprehends that the rate of solvent penetration at the interface into the unextracted in situ bitumen is the rate-limiting step, which is generally similar at a given dead oil viscosity for all of the solvents noted. Thus, the choice of solvent for a given reservoir condition, is determined by factors other than simply the solvent effect of the solvent into the particular bitumen being extracted.

The correlation of FIGS. 1 and 2 relate three critical properties together, namely porosity (pore volume fraction) of the recovery zone of the underground formation which contains the bitumen, oil viscosity (dead oil viscosity at the bitumen interface and temperature in the underground formation) and permeability (the ability of fluid to pass through the underground formation containing the bitumen to be extracted). Of these three factors, the only one that can be easily changed and thus controlled in an in situ extraction process is the oil viscosity. Thus, the present correlation shows that the oil viscosity is the key rate limiting parameter that can be controlled in an in situ extraction process because permeability and porosity are generally fixed by the sand matrix in the reservoir. The oil viscosity can be controlled by controlling the extraction temperature of the process, i.e. using the solvent as a heat delivery medium. Thus, the key question for designing a solvent extraction process is—which particular solvent has the most appropriate or advantageous heat delivery characteristics for a target reservoir, rather than considering what solvent effect a given solvent might have and designing the extraction based on that. Much of the difficulty with the prior numerical approaches is believed to be as a result of an undue emphasis on the solvent effect (phase equilibria and phase characteristics etc).

Figure 3:
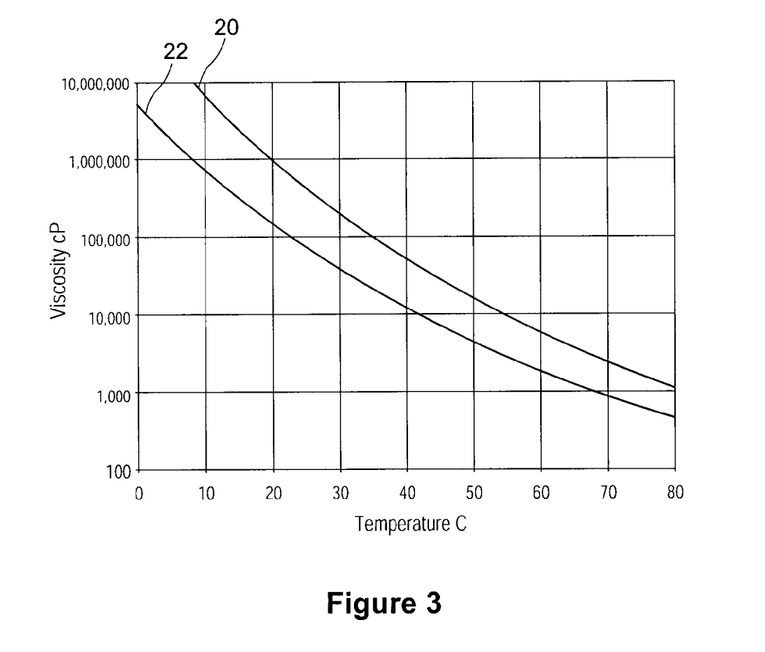
FIG. 3 is a representative plot of the change in viscosity with temperature for a specific sample hydrocarbon, by way of example, namely Athabasca bitumen and the two lines bracket the range of viscosities normally observed for this particular bitumen.

FIG. 3 is a plot of a range of viscosities (y axis) observed for a representative sample of Athabasca bitumen as a function of temperature (x axis). Two trend lines 20, 22 are shown which generally bracket measured results. As will be understood by those skilled in the art, the specific characteristics of individual bitumen samples can vary widely, due to the variable nature of the natural bitumen. With an original in situ temperature of about 10° C., the graph shows that a 30° C. increase in extraction temperature (i.e. to 40° C.) typically provides a hundred fold reduction in the bitumen viscosity. It will be understood by those skilled in the art that these particular viscosity curves are provided by way of an example only, and that other hydrocarbon samples having other viscosity curves are also suitable for the present invention. This particular sample is useful in showing the steep change in viscosity over a short temperature range, and this type of relationship is also observed for other immobilized hydrocarbons located within underground reservoirs, such as heavy oil. The specific values of the viscosity change with temperature will differ, but the trend, of a precipitous drop in viscosity with a small increase in temperature is believed to be universal enough to provide wide application of the present invention to in situ hydrocarbon resources, including both tar sand resources and heavy oil hydrocarbon reservoirs.

Consider the following example for estimating oil production rates for an Athabasca bitumen according to the present invention. A sample reservoir has a permeability that is reported to be 5 Darcy, with 20 m of pay height and the extraction is proposed for a 500 m long horizontal well pair. For a fully developed chamber, namely one that has an extraction surface on either side of the well pair that has reached the full height of the pay thickness, the bitumen interface area is approximately $2\times20\times500=20,000$ m$^2$. Assuming a natural in situ temperature of 7° C., the bitumen viscosity is 8 million cP. If the porosity of the reservoir is 35% then the correlation parameter, $\mu/k\phi$ is 4.6 million (=8,000,000/(5×0.35)). Plotting this value onto the graph of FIG. 1 and then reading the Y-axis value from the correlation shows that the expected mass flux for this example is about 23 gm/m$^2$hr. This translates to a maximum oil production rate of about 11 m$^3$/day or about 70bopd. A VAPEX (unheated) propane solvent extraction would be predicted or estimated to have a maximum recovery rate of 70bopd.

Consider the same example, but this time using a condensing solvent process that releases heat at the interface at 40 C. If the bitumen at the interface was warmed to 40 C, then the bitumen viscosity is reduced to about 25,000 cP (the mid point 40 between lines 20, 22) and the correlation of FIG. 1 would predict a rate of 388 gm/m$^2$ hr for a maximum field production rate of 186 m$^3$/day or 1173 bopd. Thus, according to the present invention, the prediction is that the maximum oil extraction rate would be accelerated by more than 10 fold with only a 30° C. increase in the extraction temperature, for a reservoir having these characteristics. For a 200 m spacing between adjacent horizontal well pairs, extraction at 40 C provides an estimated minimum depletion time of 8 years while extraction at unheated conditions will require an estimated minimum time of more than a century.

The economics of a commercial extraction plant with a given total production rate for an extraction process such as condensing solvent process are fairly insensitive to the oil production rate per well pair once the production rate per well pair exceeds an economically determined minimum economic recovery rate. The minimum economical recovery rate will depend upon the input cost parameters which will vary from site to site, including solvent costs and oil prices, but a reasonable estimate for the minimum extraction rate per well pair at present economic conditions is about 50 m$^3$/day. The lack of sensitivity arises because a given total plant capacity (i.e., 10,000 bbl/day for 30 years) requires a fixed amount of in situ resource and a fixed number of wells. Faster extraction rates reduce the number of active wells but require more frequent replacement of producing well pairs. Thus, the commercial benefit of higher extraction rates per well pair is primarily due to the deferral (i.e. timing) of capital expenses rather than their avoidance. On the other hand, higher extraction rates per well pair (i.e. choosing process conditions to further reduce the viscosity) require increases to the extraction pressure and temperature, which in turn increase both operating expenses via energy costs, and capital costs like facility costs Higher temperatures generally mean higher solvent oil ratios. A higher solvent volume in turn requires a larger plant and equipment capacity, including bigger pumps, compressors, distillation units, piping and the like.

For example, consider a minimum target recovery rate of 50 m3/day /well pair. For an Athabasca reservoir with a 20 m pay and a 500 meter well length and a 5 Darcy permeability and a void fraction of 0.35, the correlation and the viscosity data can be used to determine that the minimum extraction temperature must be above 25° C. More specifically, in this example, the extraction surface area is 20,000 m2 and the target or desired flow rate is 50 m$^3$/day to yield a max flux (in gm/m$^2$ hr) of 50,000,000/24 hrs=$2.08\times10^6$ gms/hr over 20,000 m$^2$=104 gm/m$^2$ hr. Plotting this value of 104 gm/m2 hr yields a value on the x axis is about 210,000. Thus, 150,000=viscosity over permeability×phi or, viscosity=210,000 (5×0.35)=360,000 centipoise.

Now going back to FIG. 3, 360,000 centipoise is about at the mid point between the trend curves 20, 22 at about 25° C. Thus, 50 m3 oil/well pair per day sets a minimum extraction temperature of about 25° C., for the 20 m pay by 500 m well length assumed above. It is important to note that this calculation is based on a theoretical maximum extraction rate based on a predicted change in viscosity and does not explicitly account for other factors which will affect the rate the oil flow through the sand matrix which reduce the actual production rate below the theoretical production rate including geological heterogeneity, the effect of non-condensable gas poisoning and the change in porosity due to asphaltene precipitation. Consequently, the minimum commercial extraction rate will be achieved at an extraction temperature somewhat higher than 25 C. According to the present invention, the actual production rate will be a fraction of the theoretical maximum production rate predicted by the correlation, likely in the range of about 0.1 to 0.8, most likely about 0.2 to 0.5 and most likely between 0.3 and 0.4. This multiplier is referred to as the production rate factor. Thus, according to the present invention, the actual production rates will be calculated by multiplying the theoretical maximum production rate by the reservoir specific production rate factor. The production rate factor can be estimated by carefully examining conditions in the specific reservoir, and will depend on the local geology, nature of the bitumen and dissolved gas concentrations. More specifically noncondensable gases which lower the interfacial temperature and thus affect the viscosity or permeability conditions such as asphaltene deposits or natural clay or mud lenses affect the production rate factor.

Now it can be clearly seen that the fundamental problem with an unheated solvent vapour gravity drainage extraction process such as VAPEX applied in the Athabasca tar sands is that the oil extraction rates are far too low to achieve commercial rates of return. Although, this conclusion was reported almost 20 years ago in Reference 1, the computer models used even recently by the oil industry still predict that commercially attractive rates can be achieved with unheated vapour (Society of Petroleum Engineers paper 97924, November 2005).

According to the present invention, once a desired minimum target extraction rate is set, and based on knowing the porosity, permeability of the underground formation, and the dead oil viscosity of the in situ or native bitumen, the key question for such a reservoir is, how can in situ operating conditions be selected to obtain an extraction temperature of 25° C. or higher? Or, put another way, how can actual extraction rates be achieved which are above the desired minimum target rates.

It will be understood by those skilled in the art that the maximum extraction temperature will be determined by the economies of the capital and operating expenses as compared to the extraction rate. In other words, it is expected that the maximum operating temperature will likely be set on economic rather than on extraction rate concerns—as noted above at some point it is not economical to try to increase extraction rates due to the increased costs associated with the increased rates. However, it is believed that 75° C. is a reasonable maximum operating temperature and that in most cases the optimum operating temperature of an efficient process will be less than this value. Of course the present invention comprehends that certain reservoirs may present severe geological challenges to recovery or extraction. In such cases it may be necessary to achieve extraction temperatures above 75 C in order to obtain economic oil production rates. However, as a general observation, the need to go to 250° C., as in SAGD, is not there for a well draining reservoir—so the present invention offers a substantial energy saving derived from the much lower in situ operating temperature in the right in situ conditions.

The next question addressed by the present invention is at what pressure can the extraction process be operated at in situ, or what are the target or desired managed extraction conditions? A discussion of the effect of varying the pressure follows, but to start with consider the desire to obtain an extraction temperature of between 25° C. to 75° C. at natural or existing reservoir pressure.

Figure 4:
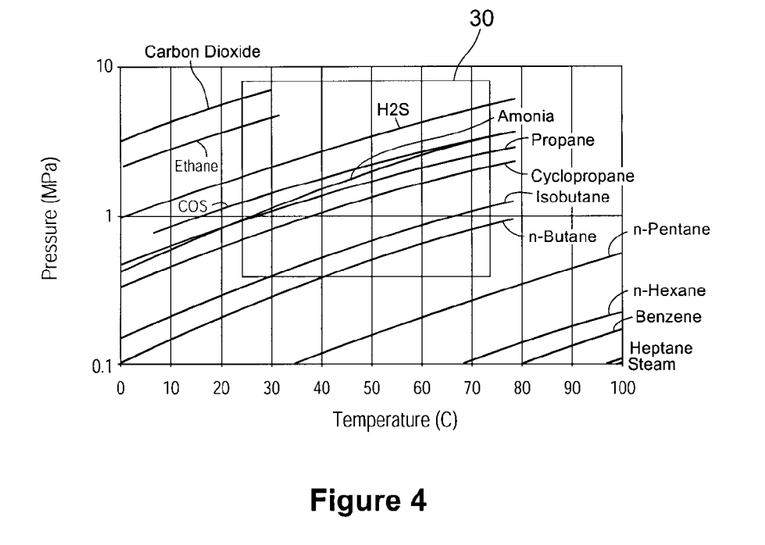
FIG. 4 is a plot of a number of solvent candidates solvents' vapor pressure against temperature, which delineates the most preferred solvents for specific reservoir conditions according to the present invention.

FIG. 4 shows the vapour pressure of a number of potential solvents against temperature. The range of temperatures and pressures within the white box 30 identify the preferred extraction conditions for the extraction of hydrocarbons based on gravity drainage, such as may be used for example in tar sand deposits. FIG. 4 shows that butane (preferably isobutane) is a preferred solvent if the operating pressure at extraction conditions is 0.4 MPa to 1 MPa, propane is a preferred solvent if the extraction pressure is 1 MPa to 3 MPa, and somewhat surprisingly, hydrogen sulphide is a preferred solvent if the reservoir pressure at extraction conditions is 2 MPa to 6 MPa. Carbonyl sulphide is a preferred solvent between 1.3 MPa and 3.7 MPa and ammonia is a preferred solvent between 1 MPa and 3.6 MPa. Thus, by choosing the appropriate solvent, a full range of extraction pressures can be covered within the preferred temperature range of 25° C. to 75° C. In other words the present invention can help select which solvent to use, for a reservoir of a given depth (and hence natural pressure), based on knowing what temperature rise is required to change the viscosity enough to achieve production and what solvent can deliver such a temperature rise at or about the native pressure.

Carbon dioxide and ethane are also potential solvents but they are generally believed inappropriate for gravity drainage processes in tar sands such as Athabasca because their vapour pressures are very high and their condensation temperatures and latent heats are very low. Within the preferred pressure and temperature range identifiable by the box 30 of FIG. 4, $CO_2$ and ethane have latent heats below 200 J/gm and are therefore considered too low to be able to deliver useful amounts of heat at practical solvent to oil ratios and thus can be excluded as possible candidate solvents according the present invention.

Figure 5:
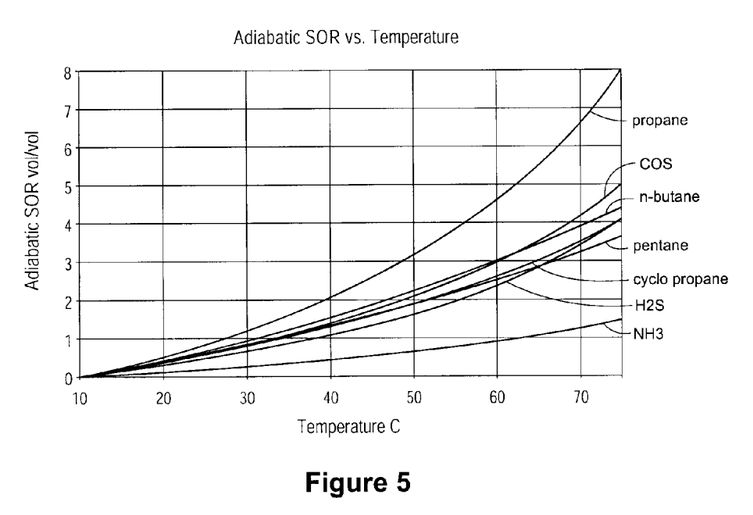
FIG. 5 is a plot of adiabatic solvent oil ratios against temperature for some candidate solvents, for a sample representative reservoir having certain assumed characteristics, according to the present invention.

FIG. 5 shows the adiabatic solvent to oil ratio (y axis) for several candidate solvents over a range of temperatures (x axis). The y axis is the volume of solvent required to heat the oil and associated sand deposit to the temperature and produce one volume of oil. In other words, it is the volume of solvent that has to condense at extraction conditions, to deliver sufficient heat to mobilize for extraction one volume of oil (ie to change the viscosity of the in situ oil enough). FIG. 5 was calculated assuming a representative reservoir has the characteristics of a porosity of 33%, a bitumen saturation of 77% and a bitumen yield (i.e. reservoir recovery factor within the chamber) of 75%. Consequently, while FIG. 5 shows useful trends, it is based on some specific representative reservoir parameters for a particular representative reservoir. Other reservoirs having other parameters can also be considered according to the present invention but the specific graph for such reservoirs will be determined by such other reservoirs specific characteristics. Thus, FIG. 5 is by way of example only. Further, the meaning of adiabatic in this context means that external heat loss outside of the extraction chamber is ignored and so the solvent to oil ratio is a theoretical minimum. Actual solvent to oil ratios will be somewhat higher, depending upon the degree of heat loss to any part of the chamber other than the bitumen interface, such as the overburden for example, which results in the heat being used to warm something other than the bitumen. FIG. 5 shows that there is an overlap between solvents and that under certain conditions more than one solvent can be used so there are circumstances where there is room to choose between the different candidate solvents. The choice of a particular solvent from those that can deliver the requisite reduction in viscosity at extraction conditions will depend on the solvent cost and availability and a number of other factors including porosity, oil saturation, yield and capital and operating expenses for the surface facilities and permitting. For example at an extraction temperature of 40 C, the choice of propane as a solvent provides an adiabatic solvent/oil ratio of 2 while ammonia has an adiabatic solvent/oil ratio of 0.5. Consequently, 4 times more propane must be processed by the surface facilities to achieve the same oil production rate compared to ammonia. Of course, with nonhydrocarbon solvents there will be some greater solubility of the solvent into the naturally present connate or other ground water present in the extraction chamber, so this will also affect the recovery results. If we refer back to FIG. 3, we can see that ammonia at 40 C would require operation at slightly higher pressures than propane at 40 C (i.e. 1.6 vs 1.4 MPaA). Since ammonia is currently similar in cost to propane, on a volumetric basis, the capital cost savings might justify the use of ammonia for this representative reservoir.

Two other potential solvents, $H_2S$ and COS, shown in FIG. 5 are particularly interesting. $H_2S$ is a waste byproduct of synthetic crude production. COS can be produced by reacting $H_2S$ with $CO_2$ (another waste byproduct), so the source materials should be locally available in large volumes at attractive pricing. In fact if greenhouse gas taxes are sufficiently large, it may even be possible to be paid to accept these waste products from large emitters of these waste products, meaning the solvent cost, will instead become a revenue. Both of these solvents have flammability, toxicity and corrosion issues, so there would be consequences for both capital cost and operating costs, as well as more rigorous regulatory and licensing requirements. At 40 C, the present invention provides estimated minimum adiabatic SORs for COS and H2S of 1.5 and 1 respectively. The operating pressures, according to the present invention in the representative reservoir to achieve 40 C are estimated at 2.9 and 1.8 MPaA respectively.

An issue in gravity drainage processes at present is the amount of solvent that is held up in the reservoir. Solvent hold up is an issue which cannot presently be resolved by laboratory tests due to a combination of factors such as capillary effects that overemphasize liquid holdup in lab scale (i.e. small scale) experiments and difficulties in achieving the correct wettability characteristics in sandpack experiments utilizing Ottawa sand instead of Athabasca sand. If the solvent holdup in field is an issue, then the commercial benefit of a low cost solvent may be more than enough to offset increased operating expenses and capital costs required to handle, for example, corrosive and toxic solvents. An additional benefit of the COS is that because it is less volatile than $CO_2$ it would be a better vehicle to sequester carbon in tar sand reservoirs.

For example, at 10 C and 900 kPa, COS could be sequestered in depleted extraction chambers as a liquid with a density of 1 gm/cc or more specifically 0.2 gm carbon per cc. At the same temperature and pressure, $CO_2$ would be a vapour with a density of 0.018 gm/cc or 0.005 gm carbon per cc. Thus, at typical Athabasca reservoir conditions, COS is about 40 times more effective on a volumetric basis at sequestering carbon than $CO_2$. Thus, COS offers the possibility of greatly increasing the storage capacity for sequestering carbon in the relatively shallow reservoirs that are typical in the tar sands. Of course it would not be suitable to sequester COS in a chamber that had any kind of thief zone running through it. Even though COS is a naturally occurring species and is found in the atmosphere, it is still a highly toxic and dangerous material to deal with.

It will be appreciated by those skilled in the art that the 25 to 75° C. target range criteria of FIG. 4 applies most particularly to Athabasca bitumen. On the other hand, if the target hydrocarbon resource is characterized by a lower viscosity oil to begin with, then the rise in temperature required through the latent heat of condensation delivery mechanism would be reduced. Similarly, if the heat requirement was higher for a particular target, due to lower permeability, oil saturation or higher viscosity then this would affect the choice of solvent also. If the permeability of the reservoir was lower than 5 Darcy or the viscosity was very high, then the solvent might be chosen to provide higher temperatures than set out above at the target extraction pressure.

Figure 6:
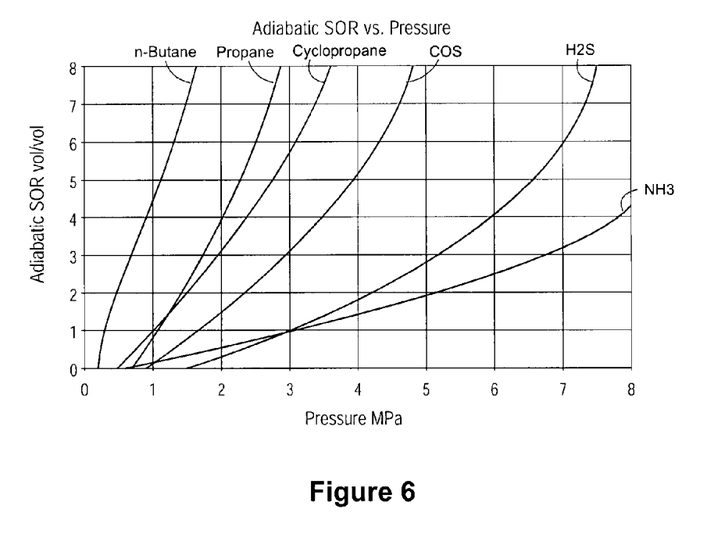
FIG. 6 is a plot of the adiabatic solvent to oil ratio, again at the same sample representative reservoir characteristics as in FIG. 5, plotted against pressure according to the present invention.

FIG. 6 shows the adiabatic SOR (y axis) vs extraction pressure (x axis). The curves, representing individual solvent species as shown in this figure were also plotted assuming 33% reservoir porosity, 77% bitumen saturation and 75% yield. Consider a relatively shallow tar sand type target reservoir which must be operated at exactly 1 MPa due to the presence of thief zones (and corresponding roughly to a depth of about 100 m). FIG. 6 provides an indication of what the preferred solvent choices might be. For example at 1 MPa isobutane has an adiabatic SOR of about 5 and propane has an adiabatic SOR of about 1. Turning to FIG. 5 it can be determined according to the present invention that isobutane at an adiabatic SOR of 5 corresponds to an extraction temperature of about 75 C and propane at an adiabatic SOR of 1 corresponds to a temperature of about 25 C. Using the viscosity data of FIG. 3 and the correlation of FIG. 1 we can now predict the maximum extraction rates and apply the reservoir specific production rate factor and current economics to determine the most economical and advantageous solvent.

In summary, either the pressure or temperature can be used in relation to solvent to oil ratio to evaluate the merits of a given solvent selection or operating conditions. Working backwards as set out above will allow the determination of the theoretical maximum extraction rates for the specific characteristics of the chosen reservoir. Making specific evaluations of the in situ conditions will yield an estimated reservoir specific production rate factor to estimate the actual production rates.

There are a number of assumptions implicit in these examples that are specific to the particular reservoir such as the initial reservoir temperature, porosity, bitumen saturation and yield. According to the present invention, each reservoir can be individually assessed in the context of its own characteristics, so the previous figures showing adiabatic SOR vs temperature or pressure are not intended to be universal. These figures are provided to show indicative relationships at one particular set of assumed reservoir characteristics by way of example only.

Consider a comparison between propane and COS for a specific reservoir. If the target reservoir is at 200 m depth, using propane at 2 MPa gives an adiabatic solvent to oil ratio of 4:1 and an extraction temperature of 60° C. Assuming the same reservoir thickness, well length and porosity, permeability oil saturation and yield as previously described, according to the present invention the maximum predicted extraction rates for propane are about 500 m3 oil per day per well pair (assuming no poisoning from non-condensable gases, geological heterogeneity such as mud lenses, disconformities and the like). This extraction rate is determined in the same manner as previously described, namely the extraction pressure of propane at 2 MPa yields an extraction temperature of 60° C. from FIG. 4. An extraction temperature of 60° C. in FIG. 4, yields a bitumen viscosity of about 3000 centipoise in FIG. 3. A viscosity of 3000 centipoise of FIG. 3, plus a porosity and permeability for the target reservoir permit the determination of a mass flux from FIG. 1. Thus, the mass flux times the interface area gives maximum oil production rate. The production rate factor is then applied to give an estimated actual production rate.

This production rate might not be the economic optimum. As noted earlier, extraction rates above 50 m3/day only have a modest impact on the commercial margins at current economic conditions. The extraction process could also be operated with COS at 44° C. and a pressure of 2 MPa. This would provide a maximum predicted production rate of more than 200 m3/day, and reduce the energy costs by 30% (i.e. a 35° C. rise vs 50° C. temperature rise) and reduce the SOR by a factor of 3 which would reduce the facility size and capital expense by about 50%. Furthermore, the use of a waste product (COS) as a solvent could eliminate the solvent inventory costs and perhaps even produce revenue via sequesteration of carbon. Consequently, with COS, the present invention predicts substantial operating and capital costs savings as well as solvent cost savings. Offsetting this commercial benefit, will be some additional capex and opex costs required to handle COS.

Having described the foregoing, the effect of the extraction pressure on the solvent selection and process design can now be better understood. In any reservoir there will be an inherent or natural pressure that is largely a function of the depth of the reservoir. However, there may be good reasons to vary the desired extraction pressure from the natural in situ reservoir pressure, depending upon the formation characteristics. If the reservoir is well confined and does not have thief zones or anomalies that prevent pressure maintenance then it might be desirable according to the present invention to operate at a pressure other than the natural pressure, either higher or lower depending upon the circumstances. Operating at a higher pressure will allow the choice of solvents to be more varied and will permit higher temperatures to be reached for specific solvents for higher extraction rates. High pressures also tend to help mitigate the poisoning effect of non-condensable gases that may be present in the extraction chamber either arising naturally or as introduced as contaminants with the solvent vapour. On the other hand, operating at or below reservoir pressure will reduce the likelihood of losing solvent to the surrounding formation. The solvent may, in some cases be an expensive or toxic component and thus it would be desirable to avoid loss of confinement.

By operating at or below reservoir pressure one could be assured that the solvent was not going to migrate away, absent thief zones.

The present invention makes it possible to enter into a comparison between Propane, COS and $H_2S$ for a specific representative reservoir (ie in circumstances where the production rate factor is not likely to vary too widely between candidates). Assume the target reservoir is at 200 m depth, and has a 2 MPa initial reservoir pressure with a high non-condensable gas content. To operate at a pressure higher than the reservoir pressure will help to mitigate the poisoning effect of non-condensable gases. According to the present invention, the following process conditions can be estimated: Using propane at 2.5 MPa, the adiabatic SOR is about 6 and the extraction temperature is about 67 C. Using COS at 2.5 MPa gives an adiabatic solvent oil ratio of about 2:1 and an extraction temperature of about 50° C. Using H2S at 2.5 MPa gives an adiabatic SOR of about 0.9 and an extraction temperature of about 35 C.

There will be many other factors to consider including safety and environmental factors as well as potential for interactions between the formation and the solvent, connate water and solvent oil yield and quality as determined by solubility of the asphaltenes in the produced fluids which will also be factored into the choice of solvent. However, as can now be understood, the present invention provides a means to compare the relative extraction rates of various solvent species at comparable reservoir conditions permitting an economic analysis to be done of the most commercial attractive solvent species to use. In addition, the present invention provides a means to determine the effect of changing extraction conditions on extraction rates for any specific solvent species, then providing an opportunity to determine the most commercially attractive extraction conditions. Lastly, the present invention provides a means to apply a reservoir specific production factor to the maximum extraction rate to yield an estimated actual rate.

The present invention comprehends considering these other factors which will cause the extraction to fall below the theoretical maximums predicted by the inventive methods in the reservoir specific production rate factor. For example, geological barriers, such as mud or clay layers may affect the ability of the solvent to fully penetrate the pay zone. The solvent will have a variable effect on the precipitation of asphaltenes, which will need to be measured, and taken into consideration in the process design. In some cases, higher extraction rates will be possible with higher upgrading, provided the asphaltenes are not deposited in a way that significantly alters the permeability of the reservoir. Thus the present invention comprehends testing the interaction between the solvent and the in situ oil at extraction conditions to see what levels of asphaltene precipitation is likely to occur before selecting the final solvent. Another aspect to consider is the presence of naturally occurring non-condensable gas, and how the process can deal with the same. Higher pressures might be required to ensure that these are efficiently removed from the extraction chamber. High solvent purities and high solvent oil ratios will be helpful to mitigate poisoning from non-condensable gases such as methane. Other local factors will also need to be analyzed to ensure that the proposed process is not adversely affected by some aspect of local in situ conditions. All of these aspects are comprehended in the reservoir specific production rate factor.

Thus, the invention provides that if reservoir pressure is set by geological constraints, such as thief zones etc, then a candidate solvent can be selected to provide the desired SOR and operating temperature to achieve the best economic result. On the other hand, if there is some flexibility to vary the extraction pressure from naturally occurring reservoir pressure then the extraction pressure can be set and the solvent selected to optimize the results at that set pressure. In other words, according to the present invention if the operating or extraction pressure is not constrained by geological considerations, then the present invention provides criteria, such as extraction rates, to determine process conditions and solvents from which to select the economically optimum operating conditions and the solvent and extraction process.

In addition to the foregoing, the present invention comprehends a range of solvents which, until now, would have been considered very unusual, if not inappropriate for gravity drainage extraction processes, such as $H_2S$, COS and ammonia. These solvents provide certain advantages relative to each other regarding operating pressure and temperature, extraction rates, latent heats (=lower SOR=lower capital costs) and solvent cost and availability.

These solvents have many special considerations and constraints due to toxicity and flammability and will have special requirements including metallurgy, but these requirements are known and appropriate safety standards can be implemented for safe operation. Thus, while some of the solvents are not particularly easy materials to work with it is not beyond reason to do so. In fact the correlation of the present invention provides a basis for selecting such solvents in specific circumstances, due to the ability to predict the extraction rates as set out above. It is also worth noting that COS is the dominant sulphur species in the earth's atmosphere and that 80% of the COS in the atmosphere arises from natural biological sources.

$H_2S$ is produced as a waste byproduct of hydrodesulphurization (HDS), so it is readily available in large quantities in the tar sands region at low or negligible cost. A recent report from the NEB of Canada predicts that 5 million tons per year of sulphur byproduct will be produced from tar sands upgrading by 2015. This would be sufficient to produce several million bbls per day of oil. Furthermore if this sulphur byproduct was reacted with $CO_2$ to produce COS then use of COS as a solvent would sequester about 6 megatons per year of $CO_2$.

The present invention comprehends that an in situ gravity based drainage process would include the steps of injecting the solvent into the formation at extraction conditions, to deliver heat and mobilize the hydrocarbons. This will form a mobile extraction fluid which is comprised of the bitumen, the solvent and likely also some water and non-condensing gas species. This mobile extraction fluid is then gathered within the formation, via gravity drainage to a production well, and lifted to the surface, for treatment in a surface facility.

The surface facility would have, for example, the capability of separating the solvent from the hydrocarbons, and conditioning the hydrocarbons so that they can be placed in a pipeline for transport. The separated solvent can then be purified to at least a level that will mitigate the poisoning of the extraction process by non-condensables which may be present in the extraction chamber. In essence the solvent will be under-saturated in the non-condensable species at extraction conditions. In this way, the naturally occurring or introduced non-condensables can be controlled and removed as part of the extraction process. A source of make up solvent is required, and can be added to the injected solvent as needed.

While the foregoing description has described certain preferred embodiments of the invention the full scope of the invention is to be determined by the attached claims. Various modifications and variations are possible without departing from the broad scope of the invention as defined in the appended claims, While some of these have been discussed above, others will be apparent to those skilled in the art. For example, it is possible to use the present invention to estimate one or more of a desired solvent, extraction temperature, extraction rate, solvent to oil ratio or extraction pressure, according to prevailing economic conditions.

The embodiments of the invention in which an exclusive property or privilege is claimed are defined as follows:

1. An in situ condensing solvent extraction process for the recovery of hydrocarbons from a hydrocarbon bearing formation, comprising the steps of:
    a) selecting a solvent consisting of one of the group of $H_2S$, Ammonia or COS;
    b) purifying said selected solvent to permit said solvent to control and remove non-condensible species from the hydrocarbon bearing formation;
    c) injecting said solvent into the formation at a condensation temperature of between 25° C. and 75° C;
    d) condensing the selected solvent within the formation to mobilize the hydrocarbons for extraction by forming a mobile in situ condensed extraction fluid; and
    e) lifting the extraction fluid containing at least the mobilized hydrocarbons and the solvent from the underground formation to the surface.

2. The in situ extraction process as claimed in claim 1 wherein said hydrocarbon is extracted by injecting the solvent as a vapour into the formation, which vapour condenses to release a latent heat of condensation to the hydrocarbons.

3. The in situ extraction process as claimed in claim 1 further including the step of separating the mobilized hydrocarbons from the lifted extraction fluid in a surface facility.

4. The in situ extraction process as claimed in claim 1 wherein a volume of make up solvent is added to the solvent recovered from the extracted fluids before the solvent is re-injected into the formation.

5. The in situ extraction process as claimed in claim 1 wherein said process further includes managing one or both of a solvent injection pressure and temperature to create a gravity drainage extraction chamber in the hydrocarbon bearing formation.

6. The in situ extraction process as claimed in claim 5 further including the step of separating at least some recovered solvent from the extraction fluid in a surface facility.

7. The in situ extraction process as claimed in claim 6 wherein the solvent is sufficiently purified to undersaturate any noncondensable species in the solvent to permit the solvent to remove noncondensable gases present in the formation at extraction conditions.

8. The in situ extraction process as claimed in claim 6 wherein said solvent is sufficiently pure to remove enough noncondensable species at extraction conditions from preventing continued mass and heat transfer at an in situ extraction surface in said gravity drainage chamber.

9. The in situ extraction process as claimed in claim 6 wherein said solvent is purified to remove noncondensable species from the solvent.

10. The in situ extraction process as claimed in claim 9 wherein said purified solvent is re-injected into the formation.

11. A method of estimating extraction rates for an in situ extraction process for a specific hydrocarbon bearing reservoir comprising the steps of:
    a) determining at least the average porosity, dead oil viscosity and permeability for the specific reservoir;
    b) consulting a data correlation which relates these three reservoir characteristics together to determine a desired mass flux rate,
    c) selecting a solvent to achieve said desired mass flux rate based on the data correlation which relates these three reservoir characteristics, and
    d) wherein said solvent selection step comprises selecting solvents having vapour pressures between about 400 kPa and 8 MPa within a temperature range of about 25 C to 75 C and a latent heat of condensation of greater than about 200 J/gm.

12. The method of estimating extraction rates for an in situ extraction process for the recovery of hydrocarbons as claimed in claim 11 wherein the solvent is further selected as having a solubility parameter of between 24 $(MPa)^{1/2}$ and 6 $(MPa)^{1/2}$.

13. The method of estimating extraction rates for an in situ extraction process for a specific hydrocarbon bearing reservoir as claimed in claim 12 further including comparing candidate solvents to determine the predicted solvent to oil ratio for each solvent candidate at extraction conditions.

14. The method of estimating extraction rates for an in situ extraction process for a specific hydrocarbon bearing reservoir as claimed in claim 13 including the step of determining a desirable in situ extraction pressure and selecting a solvent that will provide a predicted commercial extraction rate at that pressure.

15. The method of estimating extraction rates for an in situ extraction process for a specific hydrocarbon bearing reservoir as claimed in claim 13 including the step of determining a desirable in situ extraction temperature, and selecting said solvent having regard to the desired in situ extraction temperature.

16. The method of estimating extraction rates for an in situ extraction process for a specific hydrocarbon bearing reservoir as claimed in claim 15 including the step of determining a pressure operating range in which the solvent will be confined within the formation, and selecting a solvent to provide a predetermined temperature rise within said pressure operating range.

17. An in situ method for a specific hydrocarbon bearing reservoir said method comprising the steps of:
    a) establishing a minimum desired extraction rate of hydrocarbons from said reservoir, said minimum desired extraction rate being based on porosity, permeability, and dead oil viscosity values determined for in situ bitumen in said reservoir;
    b) determining a desired minimum operating extraction temperature to achieve a desired mass flux rate; and c) selecting a solvent to achieve economic extraction rates said hydrocarbons from said reservoir at said minimum operating extraction temperature at reservoir pressure;

d) injecting said solvent into the reservoir to recover the hydrocarbons.

18. A method of selecting a preferred solvent for use in an in situ extraction process for a specific reservoir, said method comprising the steps of:

a) establishing a minimum desired extraction rate of hydrocarbons from said reservoir, said minimum desired extraction rate being based porosity, permeability, and dead oil viscosity values determined for in situ bitumen in said reservoir, b) determining a desired minimum operating extraction temperature to achieve a desired mass flux rate;

c) determining a desirable range of operating pressure at which said desired minimum extraction temperature is to be achieved;

d) identifying solvents predicted to deliver said desired minimum operating extraction temperature within said desired range of operating pressures for the specific reservoir; and e) selecting a preferred solvent from said solvents identified is step d) for use in said in situ extraction process.

19. The method of selecting a preferred solvent for use in an in situ extraction process for a specific reservoir as claimed in claim 18 further including the step of determining a predicted solvent to oil ratio, and selecting a suitable solvent.

20. A method of estimating production rates for extracting hydrocarbons from an in situ formation, said method comprising the steps of:

a) determining a maximum production rate of hydrocarbons from said in situ formation, said maximum production rate being based on a data correlation of similar processes;

b) estimating a production rate factor based on reservoir specific characteristics; and c) estimating a production rate of hydrocarbons from said in situ formation, said estimated production rate being the product of said maximum production rate determined in step a) and said production rate factor estimated in step b).

21. An extraction plant for extracting hydrocarbons from an in situ formation through use of a condensing solvent and gravity drainage, said extraction plant comprising:

a) a surface facility for recovering and separating hydrocarbons, water and solvent consisting of one of the group COS, $H_2S$ and Ammonia from an extraction fluid;

b) a purifier to purify said recovered solvent for reinjection;

c) a compressor for permitting said purified solvent to be injected at a predetermined pressure; and d) a lifting means for lifting extraction fluids from said formation, wherein said extraction plant is sized to process an amount of hydrocarbons estimated to be producible from said in situ formation per unit time and said estimated amount of hydrocarbons producible from said in situ formation per unit time is equal to a maximum amount of hydrocarbons estimated to be producible from said in situ formation per unit time multiplied by a reservoir specific production rate factor.

* * * * *